Figure 22:
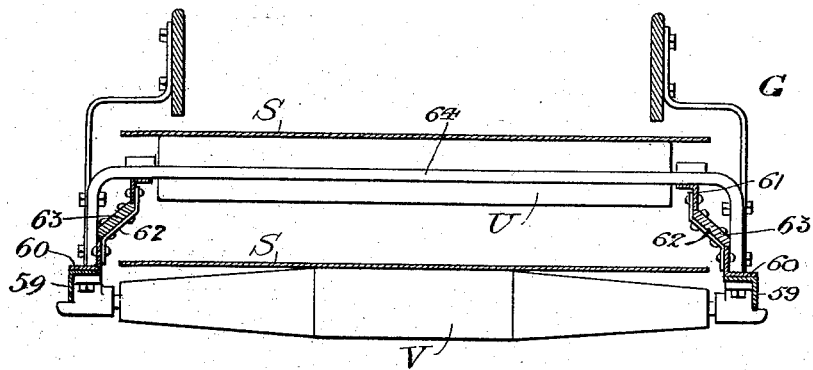

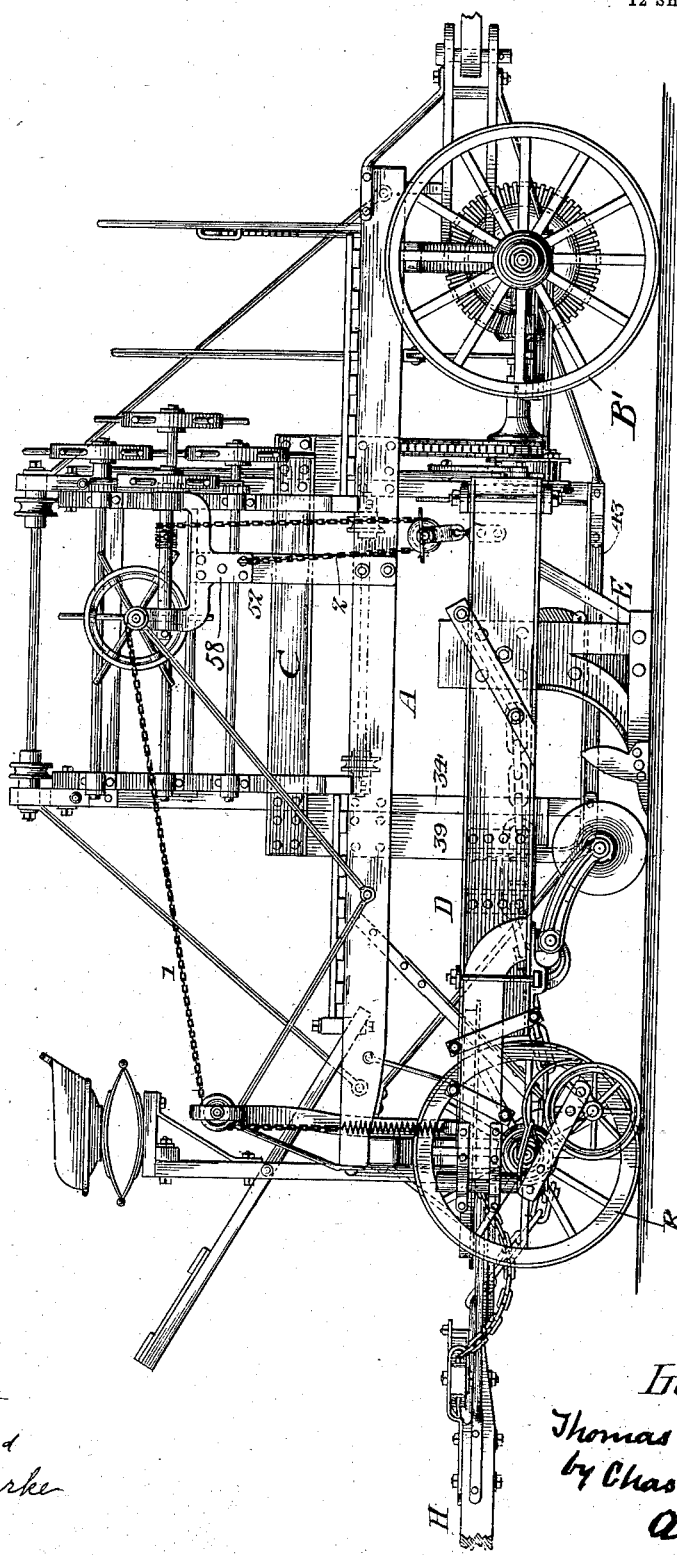

No. 743,487. PATENTED NOV. 10, 1903.
T. J. GRAY.
GRADING AND DITCHING MACHINE.
APPLICATION FILED MAY 22, 1903.
NO MODEL. 12 SHEETS—SHEET 2.
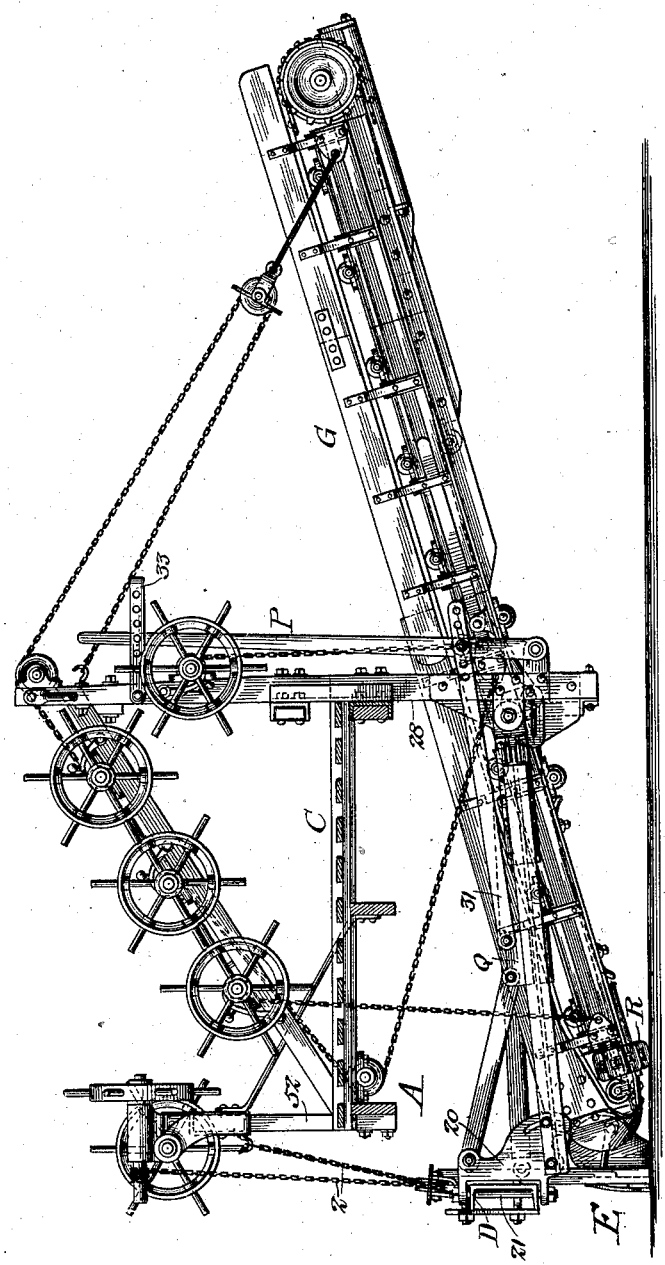

No. 743,487. PATENTED NOV. 10, 1903.
T. J. GRAY.
GRADING AND DITCHING MACHINE.
APPLICATION FILED MAY 22, 1903.
NO MODEL. 12 SHEETS—SHEET 3.
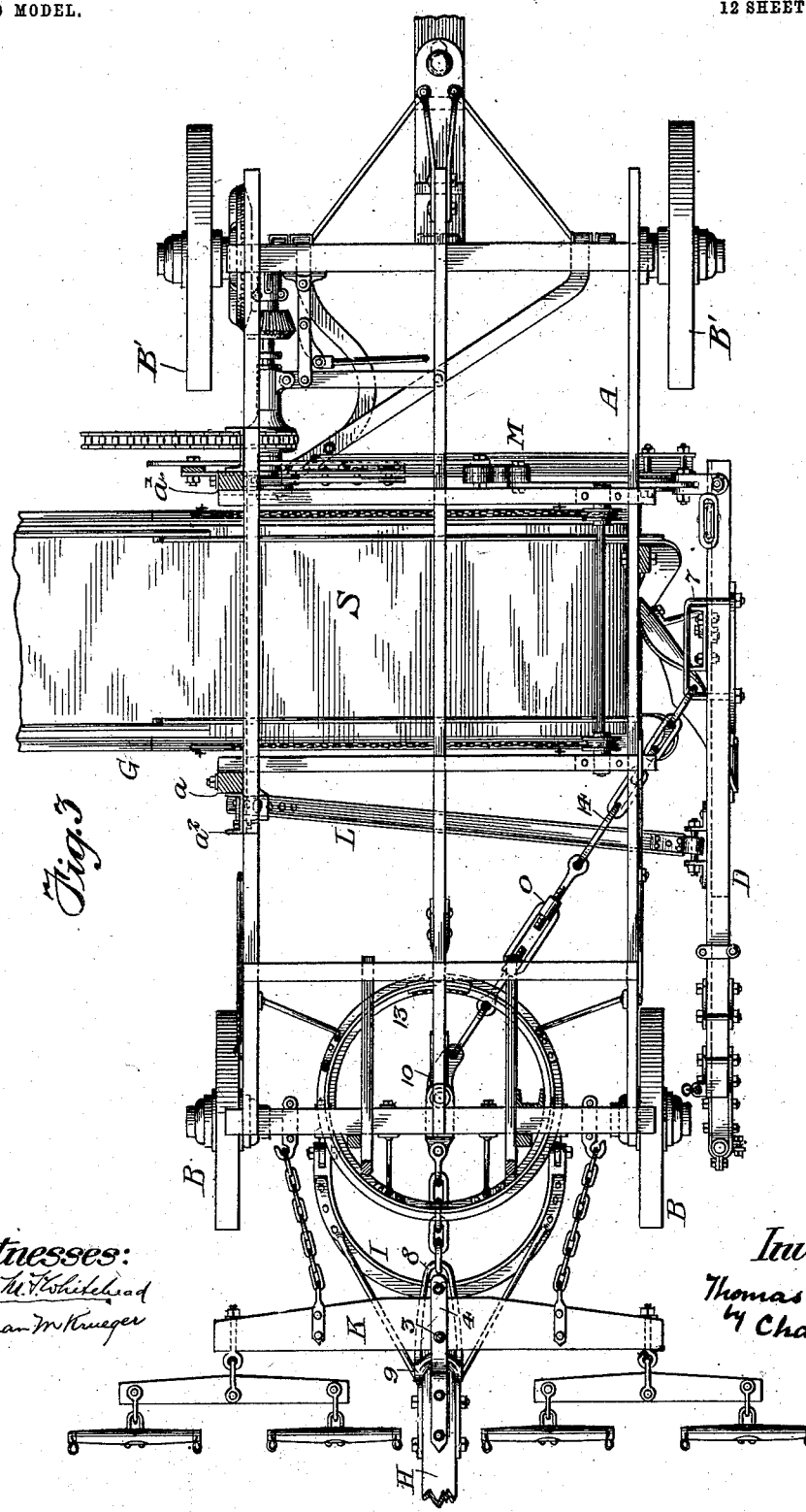

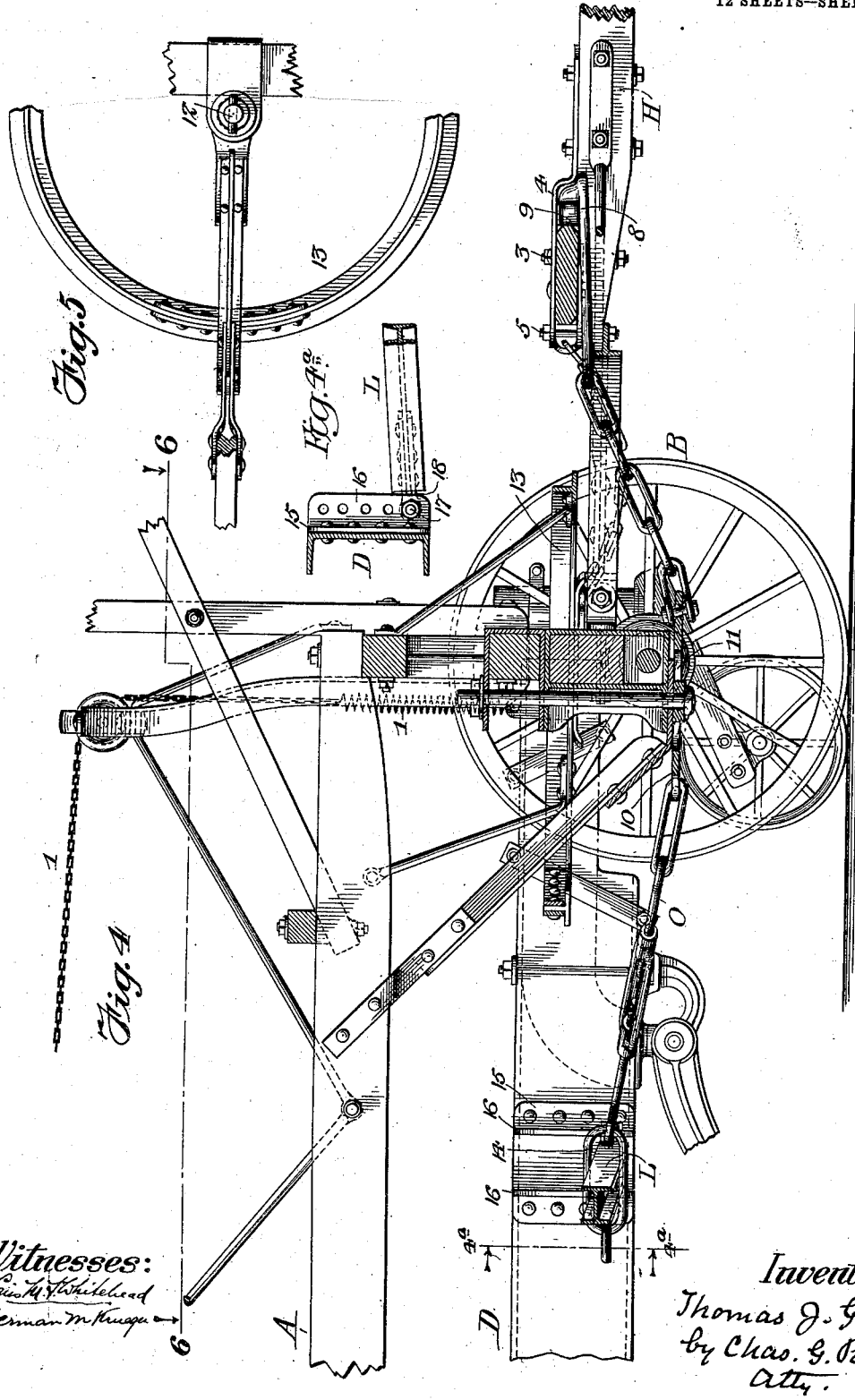

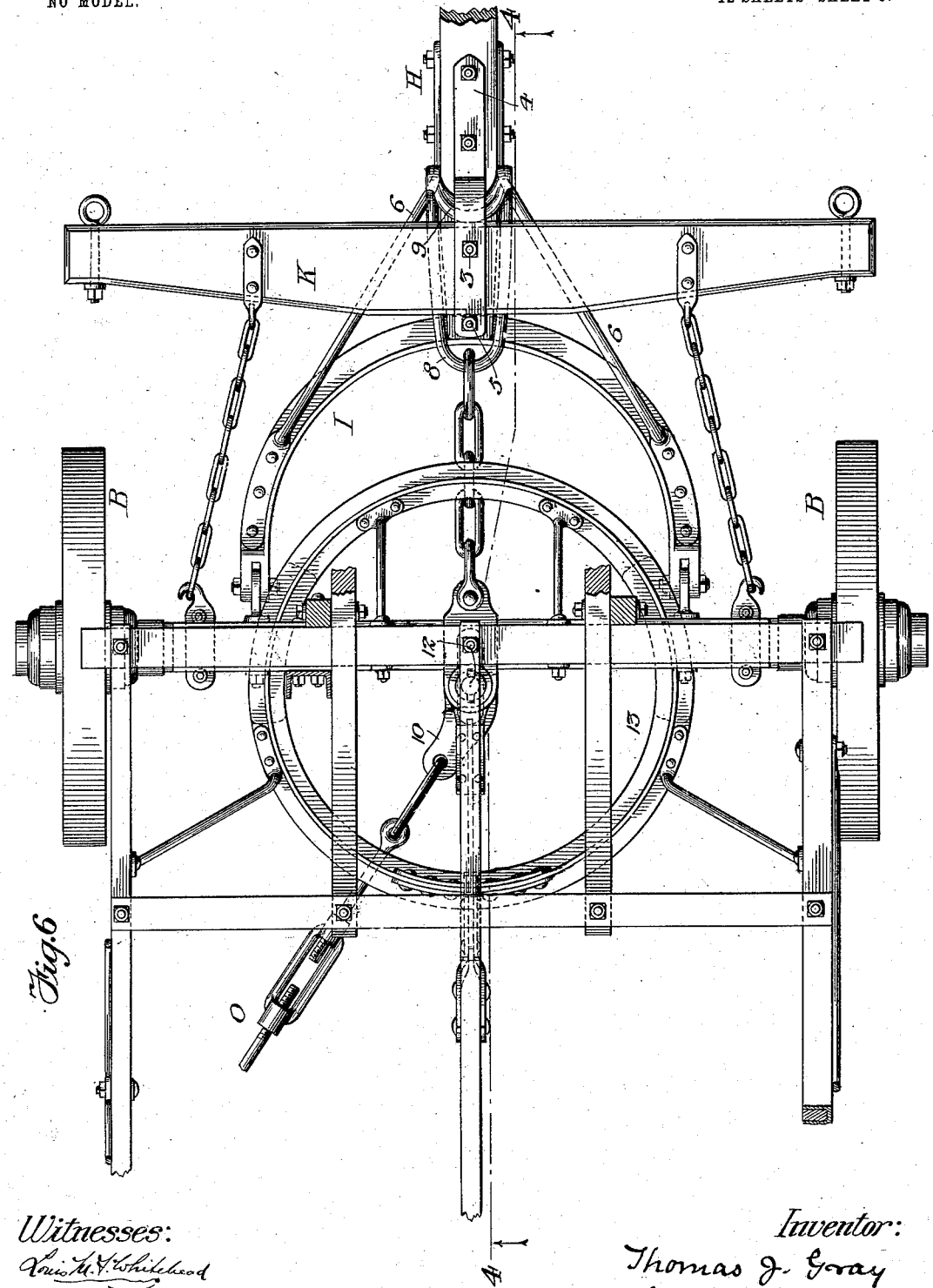

No. 743,487. PATENTED NOV. 10, 1903.
T. J. GRAY.
GRADING AND DITCHING MACHINE.
APPLICATION FILED MAY 22, 1903.
NO MODEL. 12 SHEETS—SHEET 6.
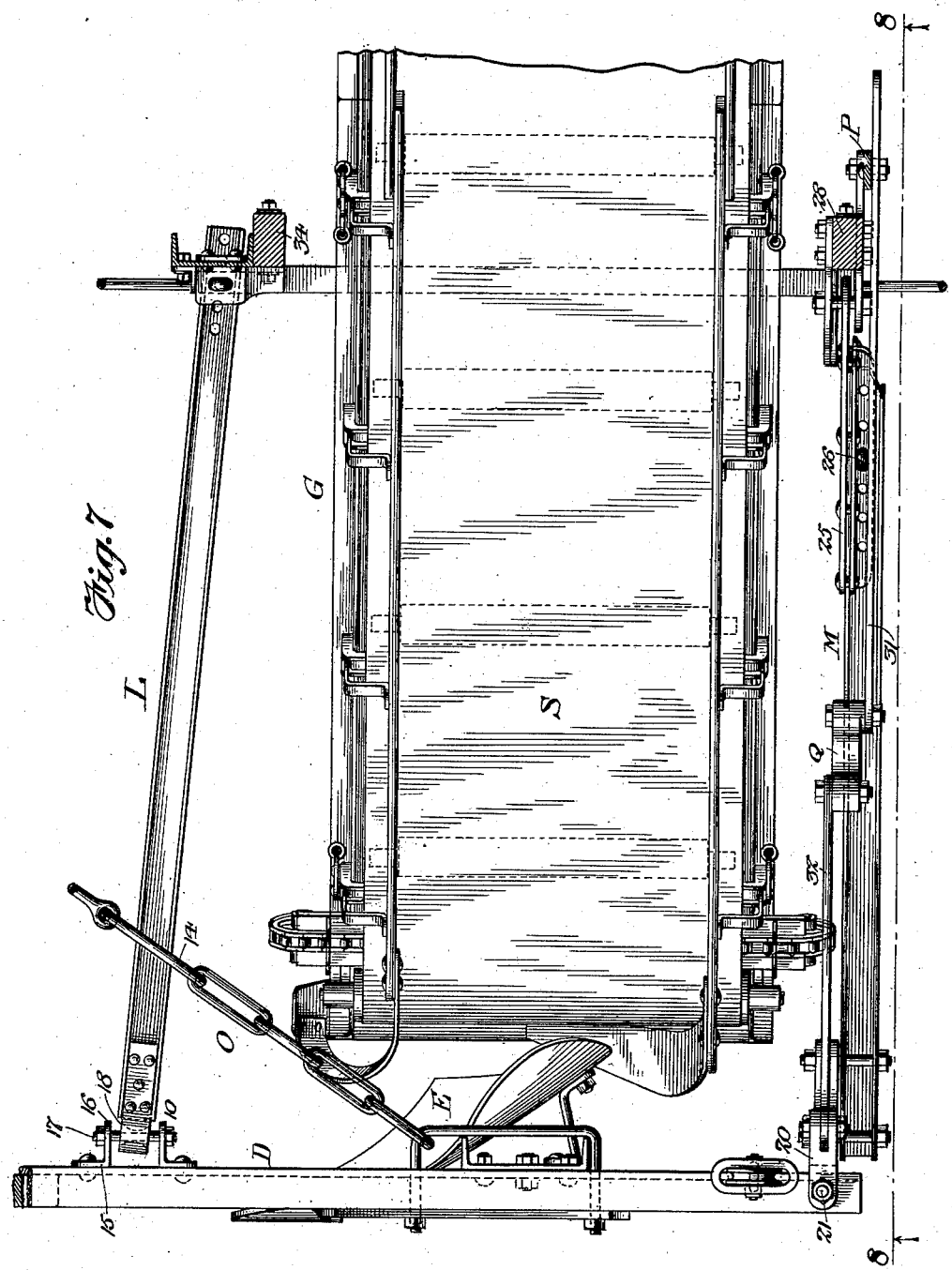
Witnesses:
Louis W. Whitehead
Herman M. Krueger.
Inventor:
Thomas J. Gray
by Chas. G. Page
atty.

No. 743,487. PATENTED NOV. 10, 1903.
T. J. GRAY.
GRADING AND DITCHING MACHINE.
APPLICATION FILED MAY 22, 1903.
NO MODEL. 12 SHEETS—SHEET 7.
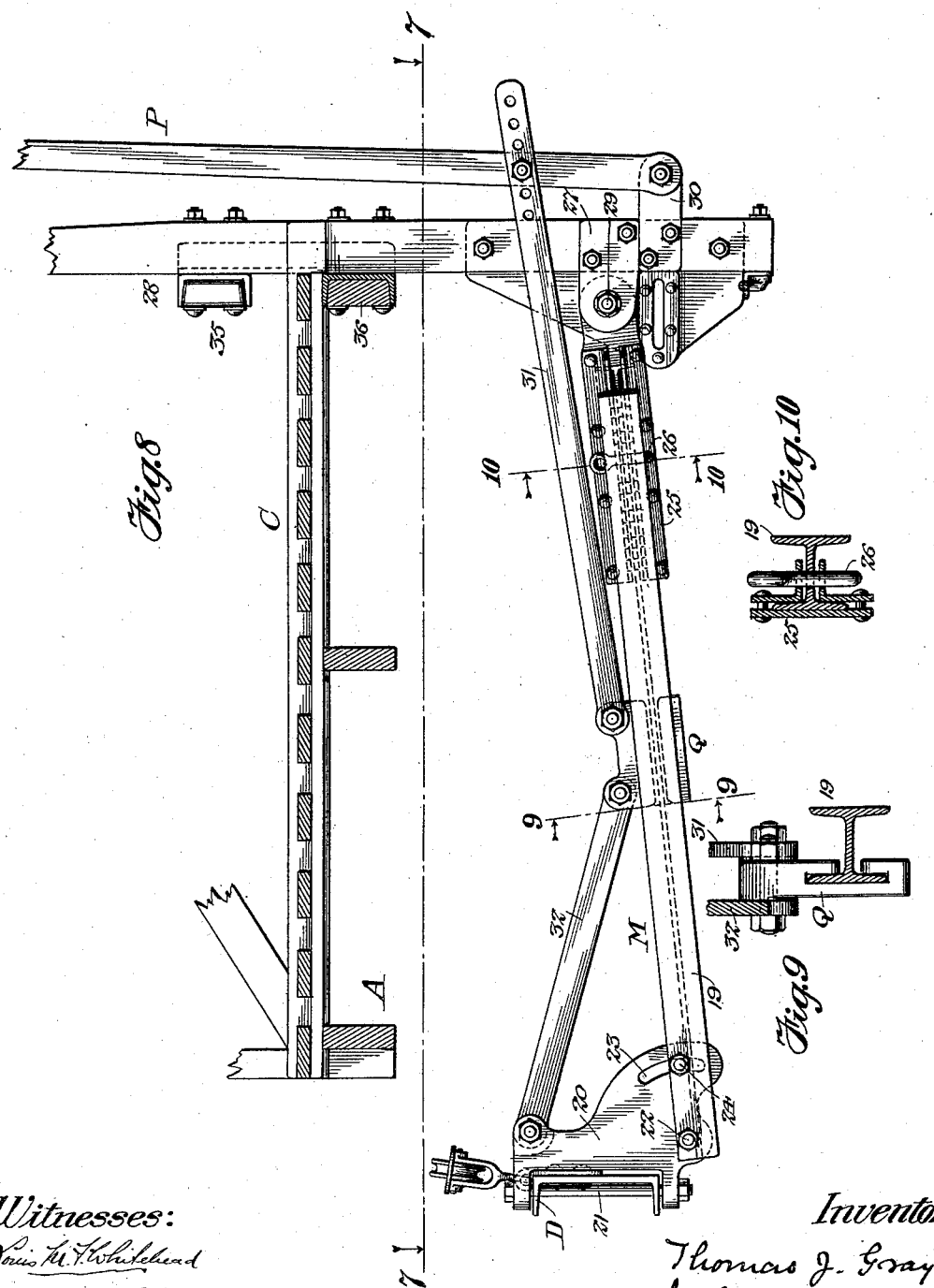
Witnesses:
Inventor:
Thomas J. Gray
by Chas. E. Page
Atty.

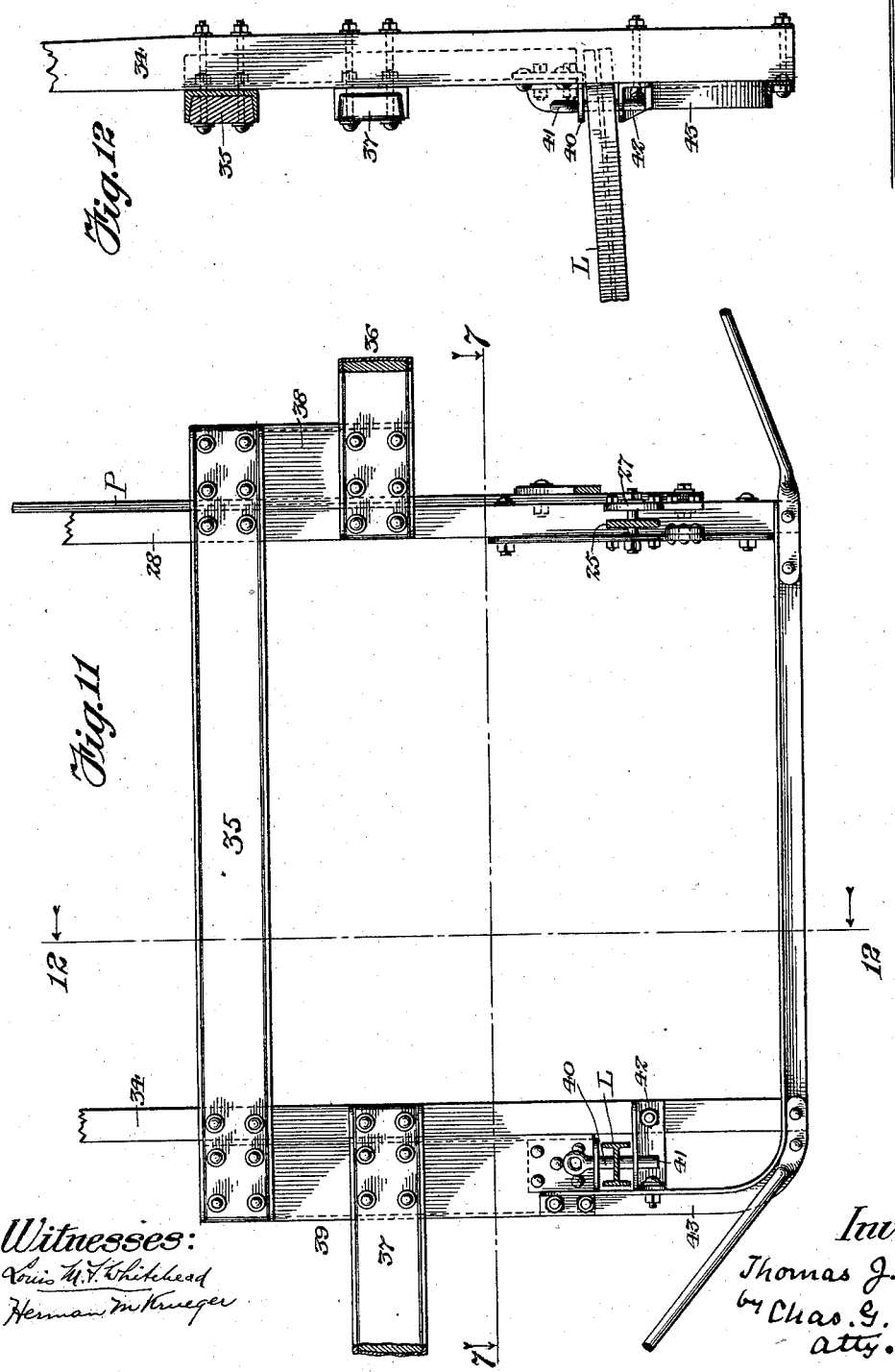

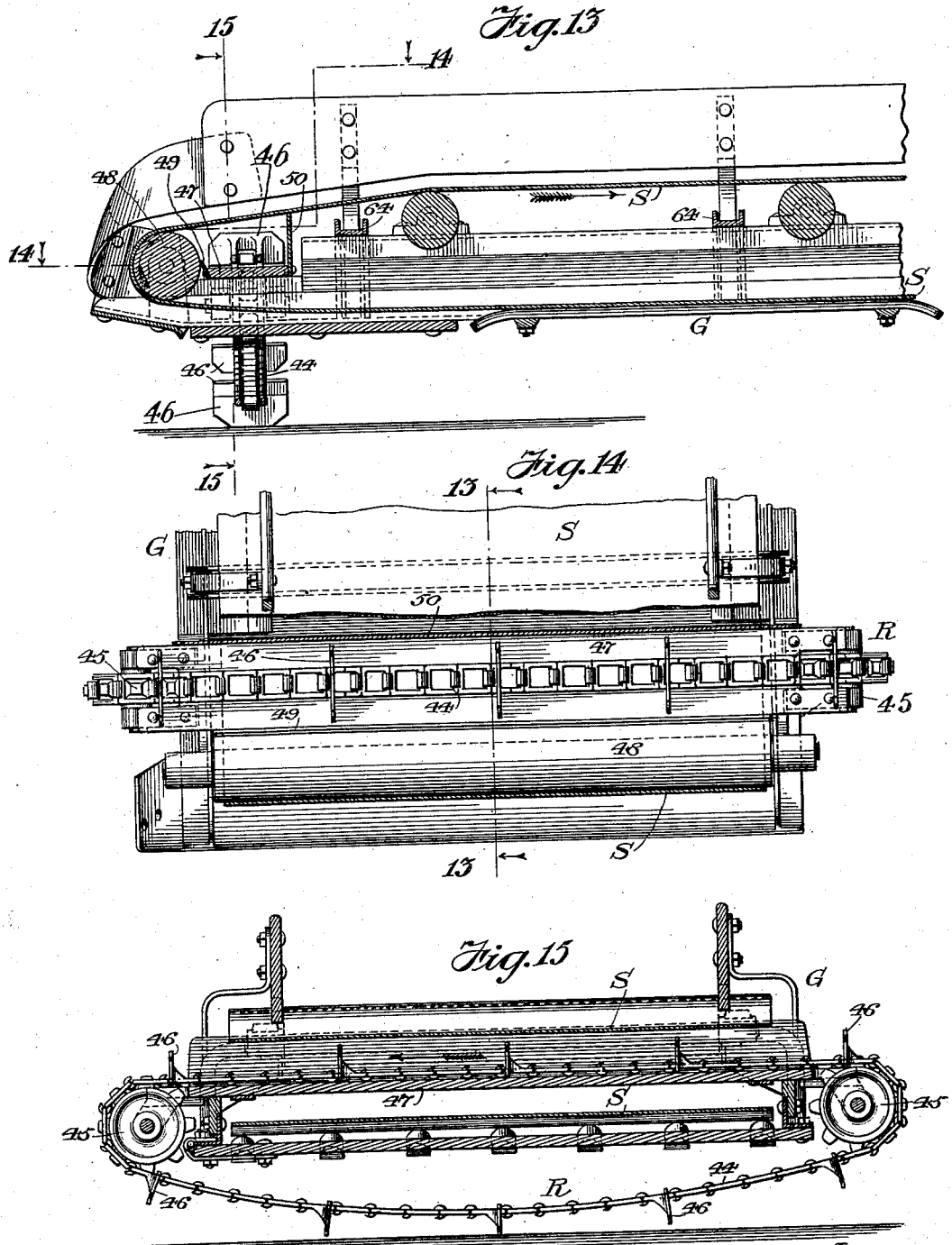

No. 743,487. PATENTED NOV. 10, 1903.
T. J. GRAY.
GRADING AND DITCHING MACHINE.
APPLICATION FILED MAY 22, 1903.
NO MODEL. 12 SHEETS—SHEET 10.
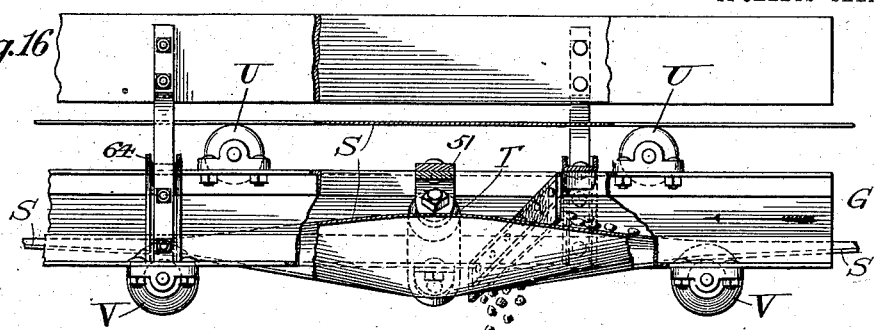
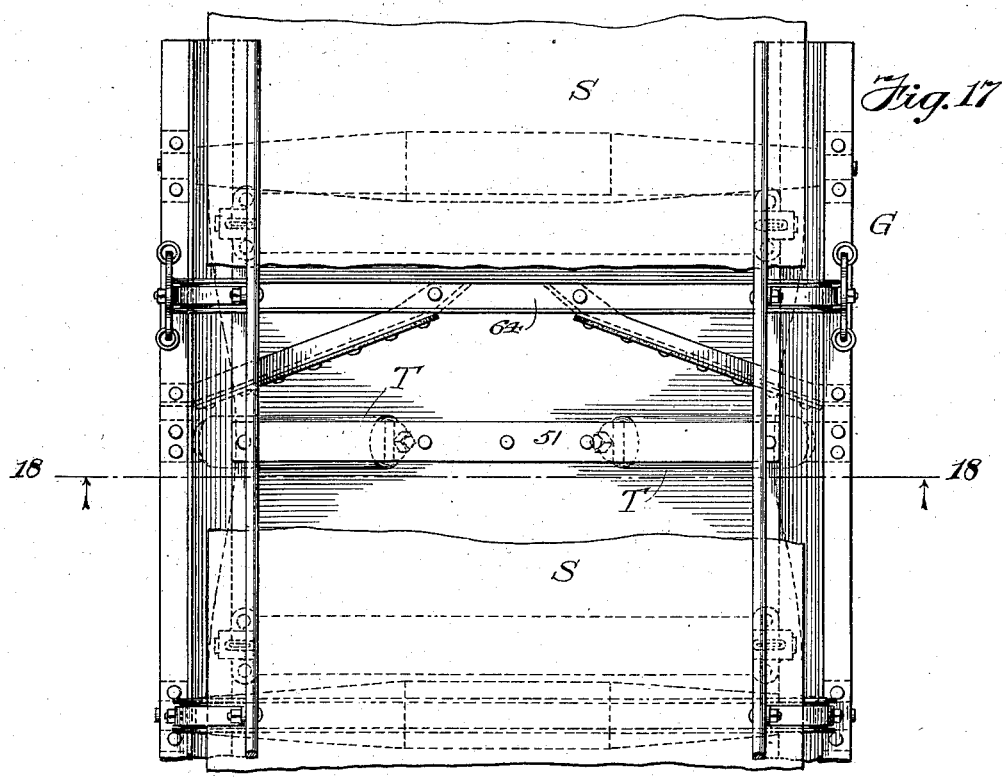
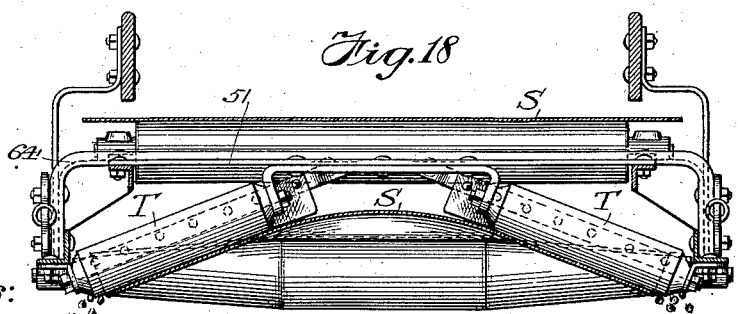

No. 743,487. PATENTED NOV. 10, 1903.
T. J. GRAY.
GRADING AND DITCHING MACHINE.
APPLICATION FILED MAY 22, 1903.
NO MODEL. 12 SHEETS—SHEET 11.
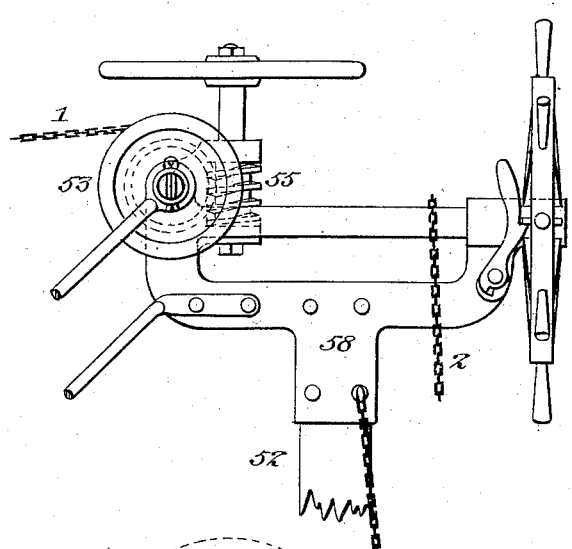
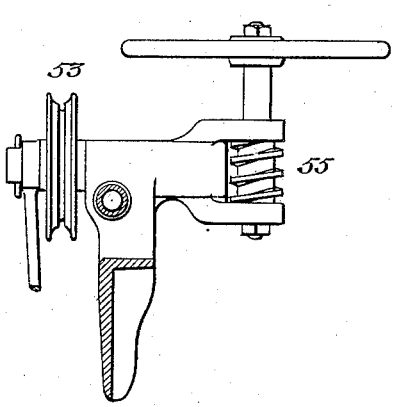
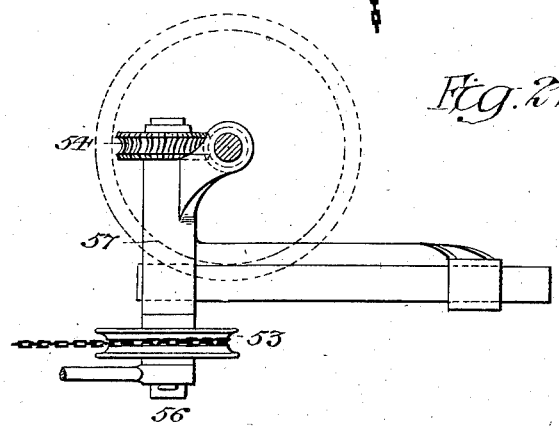

No. 743,487. PATENTED NOV. 10, 1903.
T. J. GRAY.
GRADING AND DITCHING MACHINE.
APPLICATION FILED MAY 22, 1903.
NO MODEL. 12 SHEETS—SHEET 12.

Witnesses
Louis M. F. Whitehead
Elizabeth Burke

Inventor
Thomas J. Gray
by Chas. G. Page
Atty.

No. 743,487. Patented November 10, 1903.

UNITED STATES PATENT OFFICE.

THOMAS J. GRAY, OF CHICAGO, ILLINOIS, ASSIGNOR TO NATIONAL DRILL AND MANUFACTURING COMPANY, OF CHICAGO, ILLINOIS, A CORPORATION OF WEST VIRGINIA.

GRADING AND DITCHING MACHINE.

SPECIFICATION forming part of Letters Patent No. 743,487, dated November 10, 1903.

Application filed May 22, 1903. Serial No. 158,258. (No model.)

*To all whom it may concern:*

Be it known that I, THOMAS J. GRAY, a citizen of the United States, residing at Chicago, in the county of Cook and State of Illinois, have invented certain new and useful Improvements in Grading and Ditching Machines, of which the following is a specification.

My invention relates to grading and ditching machines involving a wheeled carriage having a transversely-arranged inclined elevating-conveyer and a longitudinally-arranged plow-beam suspended at one side of the carriage and provided with a plow which is positioned to deliver the plowed-up soil to the lower end of the elevating-conveyer, the plow-beam being raised and lowered by suitable raising and lowering devices and being stayed and controlled by fore-and-aft transversely-arranged swinging stay or controlling bars, which have articulated connections with the plow-beam and the body-frame. Expired patent to H. Vannatta, No. 108,217, October 11, 1870, shows, for example, a machine of such nature with the elevating-conveyer omitted, while expired patent to Edwards and Durkee, No. 275,614, April 10, 1883, shows a machine of such construction, with an elevating-conveyer arranged as hereinbefore mentioned.

Objects of my invention are, first, to relieve the pole from draft strain incident to the back pull or resistance of the plow and to transfer such strain to the evener in opposition to the pull of the team; second, to cause the plow to run level or horizontal regardless of its wear, to automatically keep the plow down to its work, and to utilize the draft-chain as a means for thus controlling the plow and for keeping it down to its work in accordance with the condition of the plow or the soil, or both, as a result of the advancement of the machine and disposition on the part of the draft-chain to straighten out; third, to provide improved adjusting means for effecting side tilt on the part of the plow and to permit an attendant upon the machine to cause such tilting adjustment on the part of the plow while the machine is in operation; fourth, to provide efficient means for longitudinally adjusting the rear stay or controlling bar; fifth, to provide improved means for holding the forward stay or controlling bar; sixth, to more effectively free the belt of the elevating-conveyer from such soil as may get in between its upper and lower leaves; seventh, to readily free the belt of the elevating-conveyer from such small stones as may find their way between its leaves; eighth, to provide certain novel and improved details serving to increase the general efficiency of ditching and grading machines.

In the accompanying drawings, Figure 1 is a side elevation of a grading and ditching machine involving my improvements, the elevating-conveyer being omitted for convenience of illustration. Fig. 2 is a section on a vertical plane transversely through the machine at one side of the elevating-conveyer. Fig. 3 is a plan view of the lower portion of the machine, said plan being the result of a horizontal section on a plane just below the platform C shown in Fig. 2. Fig. 4 is a vertical section, on a larger scale, through the forward portion of the machine on line 4 4 in Fig. 6. Fig. 4ª is a section through the plow-beam at one side of the stay-bar L. Fig. 5 is a detail showing a portion of the circle or fifth-wheel and a coupling link or brace. Fig. 6 is a top plan view of a part of the forward portion of the machine, including the circle or fifth-wheel and the evener. Fig. 7 is a detail showing in plan view a portion of the machine as the result of a horizontal section on line 7 7 in Fig. 8. This view comprises a portion of the elevating-conveyer, the plow-beam, and the two stay or controlling bars. Fig. 8 is a section on line 8 8 in Fig. 7. Fig. 9 is a detail view illustrating a section on line 9 9 in Fig. 8. Fig. 10 is a detail illustrating a section on line 10 10 in Fig. 8. Fig. 11 is a detail view showing, partly in elevation and partly in side elevation, a portion of the body-frame structure, the two articulated stay-bars being shown in cross-section. Fig. 12 is a section through Fig. 11 on line 12 12. Fig. 13 is a vertical longitudinal section through a portion of the elevating-conveyer on line 13 13 in Fig. 14. Fig. 14 is a section through Fig. 13 on line 14 14.

Figure 23:
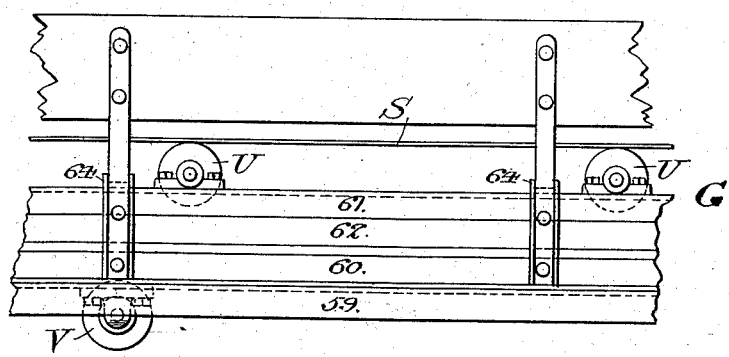

Fig. 15 is a section through Fig. 13 on line 15 15. Fig. 16 is a detail view showing a portion of the elevating-conveyer in side elevation with parts broken away and with certain parts in vertical section, so as to illustrate a device for depressing the marginal portion of the lower leaf of the conveyer-belt. Fig. 17 is a top plan of the portion of the elevating-conveyer shown in Fig. 16 with a portion of the belt broken away. Fig. 18 is a cross-section on line 18 18 in Fig. 17. Figs. 19, 20, and 21 are details representing in elevation and top plan certain improved devices for operating the chains or cables 1 and 2 by which the plow-beam is suspended. Fig. 22 is a section taken transversely through a preferred construction of frame for the elevating-conveyer. Fig. 23 represents a portion of the said frame of Fig. 22 in side elevation.

The machine is connected with a carriage or body frame A, supported upon front wheels B and rear wheels B' and having a platform C, Fig. 2, upon which an attendant can stand for the purpose of adjusting various members of the machine. The longitudinally-extending plow-beam D is arranged at one side of the machine and provided with a plow E. The plow-beam is suspended by raising and lowering chains 1 and 2, which can be arranged and operated in any known or desired way. The carriage or wheeled body-frame also supports a transversely-arranged elevating-conveyer G, which can be adjusted in accordance with well-known principles in any suitable or desired manner, said elevating-conveyer being arranged with its lower receiving end portion opposite the plow, so as to take the plowed-up soil, the general arrangement of this elevating-conveyer being best illustrated in Figs. 2 and 3. The machine is also provided with a tongue or pole H, which, as shown, for example, in Fig. 6, is connected with a yoke I, having hinge connections with the front bolster or axle. The draft of the team is directly taken by an evener K, which is pivotally connected with the tongue or pole by a pivot-bolt 3, Figs. 4 and 6, having its bearings in the tongue or pole and a strap 4 thereon, the rear end of said strap being also connected with the yoke I by a bolt 5, which likewise serves as a connection between the yoke and the rear end of the tongue or pole. The tongue or pole is also connected with the yoke I by rearwardly-diverging hounds or brace-rods 6. The longitudinally-arranged plow-beam, which is positioned at one side of the machine and suspended by flexible hangers, such as the chains hereinbefore mentioned, is drawn by a draft-chain, which converges from the plow-beam forwardly toward the middle of the longitudinal line of the machine, the oblique line of draft on the plow-beam thus involved being opposed as to any disposition to laterally shift the plow-beam by the controlling or stay bars L and M, arranged transversely to the line of progression and having articulated connections with the body-frame and the plow-beam. These two transversely-arranged stay or controlling bars L and M are connected with the body-frame at one side of the machine, while at the opposite side thereof they are connected with the plow-beam D. Said stay-bars have their jointed or articulated connections adapted to permit them to swing in all desired directions with reference to the several positions the plow-beam is caused or permitted to assume during operation, and, as shown, for example, in Figs. 3 and 7, the stay-bars are arranged fore and aft, respectively—that is to say, the stay-bar L is arranged forward and the stay-bar M is arranged in rear of the elevating-conveyer.

The plow is drawn by the draft-chain O, having its forward end attached to the forward portion of the machine and having its rear end attached to the plow-beam in rear of the stay-bar L, the connection between the plow-beam and the draft-chain being, for example, provided by a staple 7, secured to the plow-beam and engaged by the draft-chain. As a means for thus attaching the forward end of the draft-chain its forward end portion comprises a long link 8, Figs. 4 and 6, which extends under the evener K and which is provided at its forward end with a raised rounded bearing portion 9, arranged to bear against the forward side of the evener at a point intermediate of the ends of the latter, the point at which the link thus bears against the evener being directly forward of the pivot-bolt 3, by which the evener is attached. In this way back pull or lag on the part of the plow when the machine is in operation will cause the draft-chain to exert a back pull on the evener, and this "back pull," as it may be termed, which is caused by the resistance of the plow, will be met and taken by the pulling strain of the team upon the evener, thereby practically relieving the tongue or pole and its connections from undesirable strain. A portion of the draft-chain O is formed by a link 10, arranged to extend under the forward bolster or axle and maintained midway between the two front wheels by any suitable device. As, for example, it may have its oblong slot or opening 11 adapted to receive the lower end of the pivot or king-bolt 12. By such arrangement the draft-chain O extends obliquely forward to a point below the circle 13, and from thence directly forward to a point in advance of the evener. The oblique portion of the draft-chain O is adapted to engage the forward stay-bar L with a bearing engagement, whereby such stay-bar will be maintained in a uniform plane when said portion of the draft-chain is drawn straight and taut. In order to permit the draft-chain to thus bear upon the stay-bar L and at the same time allow the stay-bar to swing laterally and independently of the draft-chain without affecting the latter and avoid draft strain directly upon such stay-bar, the draft-chain has a shifting bearing connection with the stay-bar whereby the stay-bar can swing laterally and independently of the draft-chain. As an exceedingly simple connection for such purpose, the stay-bar L extends through a link 14 of the draft-chain, as in Figs. 4 and 7, the link being considerably longer than the width of the stay-bar, so as to allow the latter to have free play independently of the chain. The connection between the stay-bar and plow-beam is arranged for up-and-down adjustment. As shown in Figs. 4 and 4ª, a bracket 15 is bolted to one side of the plow-beam and provided with a pair of spaced vertical flanges 16, each having a series of holes for a pivot-bolt 17, upon which one end of the stay-bar L is loosely hung—for example, by an eye 18. By this arrangement the pivot-bolt 17 can be vertically adjusted upon the bracket 15 in accordance with requirements, it being observed that regardless of the vertical adjustment of this pivotal connection between the stay-bar and the plow-beam the draft-chain, when drawn taut, will always tend to bring the draft-bar to a uniform level. If, for example, the pivotal connection between the stay-bar L and the plow-beam is adjusted upwardly from the position shown in Fig. 4, the draft upon chain O will necessarily further depress the stay-bar, and thereby depress the plow-beam and plow. In this way the draft-chain will during operation always tend to assume a uniform level, and hence the extent to which it will hold down the plow will depend upon the adjustment of the connection between the stay-bar L and the plow-beam, and while the stay-bar will be thus held down by the draft-chain the draft will be on the plow-beam and not on the stay-bar.

The rear stay-bar M, with its connections and adjustments, is best illustrated in Figs. 7, 8, 9, and 10. As therein shown, it comprises a channel-iron or I-beam 19, having one end connected with the plow-beam D by a swinging bracket or clevis 20. The bracket or clevis 20 embraces and is attached to the plow-beam by a vertical pivot 21, and the stay-bar is attached to the bracket or clevis 20 by a horizontal pivot 22. The stay-bar can also have any suitable guide connection with the bracket or clevis—as, for example, the latter may have a curved slot 23, formed in the line of a circle about the pivot 22 and adapted to receive a guide-pin 24 on the stay-bar. The opposite end portion of the bar 19 engages in a guide-socket 25, Fig. 10, having a series of holes for a locking-pin 26, and this guide-socket 25 is hinge-connected with a bearing 27 on one of the standards 28 of the body-frame by means of a pintle or pivot 29. By this arrangement the stay-bar M can be practically extended or contracted in length for the purpose of varying the width of the furrow, it being seen that the bar 19 and the guide-socket 25 practically form two members of an extensible stay-bar which is at one end hinged or pivoted to the body-frame and at its opposite end hinge-connected with the plow-beam.

In order to permit an attendant standing upon the platform C to laterally tilt the plow-beam, the body-frame supports a hand-lever P, Figs. 2 and 8, which can be operated by said attendant thus standing upon the platform and which connects with the plow-beam by an articulated power-transmitting connection. As best shown in Fig. 8, the lower end of the lever P is fulcrumed upon a bearing 30 on the main frame, and at a point above said bearing it is adjustably connected with a slide Q by means of a connecting rod or bar 31. The slide Q is fitted to slide upon and along the stay-bar, as in Fig. 9, and it is in turn connected with the upper portion of the bracket or clevis 20 by a connecting rod or bar 32. These connecting bars or rods 31 and 32 are pivotally connected with the slide Q, the bar 31 being also pivotally connected with the hand-lever P and the bar 32 being pivotally connected with the bracket or clevis 20. By operating the lever P the bracket or clevis 20 can be tilted about the fulcrum or pivot 22 and independently of the stay-bar, and this tilt on the part of said bracket or clevis will of course laterally tilt the plow-beam and the plow. The lever P can be locked in any suitable way—for example, by means of a pin inserted through one of a series of holes in a bracket 33, Fig. 2, on the body-frame. In this way the attendant can adjustably tilt the plow without getting off the platform. The connecting rods or bars 31 and 32 incline downwardly to the slide Q, to which they are attached, and by this arrangement ample clearance is afforded—that is to say, when the stay-bar M swings upwardly the bars 31 and 32 will not strike overhead portions of the machine. In practice the pivots for the two stay-bars are what are known as "loose" pivots, the openings through which they extend being sufficiently large to permit lateral play and in effect provide universal joints.

As a matter of detail Figs. 11 and 12 illustrate a pair of standards 28 and 34, forming a portion of the body-frame and affording supports for the longitudinal frame or sill portions 35, 36, and 37, which are bolted to said standards. Upright beams or standards 38 and 39 are also arranged alongside the standards 34 and secured to the said sill portions, and to the lower end of the upright 39 is bolted a flange-plate 40, affording an upper bearing for a vertical pivot-pin 41 for one end of the forward stay-bar L, the portion of the pivot below such stay-bar having its bearing in a cross-brace 42, secured at one end to the standard 34 and at its opposite end secured to a metal brace-bar 43. This arrangement involves a strong and compact construction and also permits the stay-bar L to sustain the strain to which it is subjected, it being observed that the bar 43 also serves to rigidly connect together the lower end of the standards 28 and 34 and that the space between these standards affords clearance for the elevating-conveyer G. (Illustrated in Fig. 2.)

Figs. 13, 14, and 15 illustrate a belt-cleaner arranged upon the lower receiving end portion of the elevating-conveyer. This belt-cleaner R comprises an endless chain or narrow belt, such as a link belt 44, arranged transversely to the endless conveying belt or apron S of the elevating-conveyer and trained over a couple of idler-sprockets 45, which are respectively mounted upon opposite sides of the longitudinal frame portion of the elevating-conveyer. The chain or belt 44 is arranged so that its upper leaf passes between the upper and lower leaves of the conveyer-belt S, while its lower leaf passes under the elevating-conveyer, as best shown in Fig. 15. This belt-cleaner R is adapted to remove soil which may have collected upon the inner face of the belt S, and to such end it is provided at intervals with blades or shovels 46, which are adapted and arranged to successively engage the ground at a point under the elevating-conveyer, as in Fig. 15. When the machine as a whole is advanced, its line of advancement will of course be transverse to the length of the elevating-conveyer, and hence the engagement of the blades or projections 46 of the belt-cleaner R with the ground will cause the belt-cleaner to operate after the manner of an endless moving belt. The upper leaf of this belt 44 passes over a shelf or board 47, which is arranged transversely to the length of the elevating-conveyer and secured in any suitable way at its ends to opposite sides of the frame portion of such elevating-conveyer. This board or shelf 47 keeps the upper leaf of belt 44 from sagging and is arranged adjacent to the belt-roll 48, Fig. 13, at the receiving end of the elevating-conveyer. Said shelf 47 is provided along one edge with a scraper 49, arranged for scraping from the belt-roll 48 such soil as may have collected thereon, and it is provided along its opposite edge with a scraper 50, (preferably a rubber scraper,) arranged to scrape from the inner face of the upper leaf of the conveyer-belt S such soil as may have collected thereon, it being observed that in these machines it is very common for soil loosened up by the plow to find its way in between the upper and lower leaves of the conveyer-belt and that when such soil is sticky some of it will adhere to the lower belt-roll 48 and some of it will adhere to the inner surface of the conveying-belt S. The soil thus scraped from the belt-roll and the conveyer-belt by the scrapers 49 and 50 will be deflected onto the upper leaf of the belt-cleaner R, which will in turn carry such scraped-off soil along the shelf 47 and discharge it at one side of the elevating-conveyer.

It also frequently happens in the use of machines of this class that matters, such as small stones or gravel and the like, get in between the upper and lower leaves of the elevating-conveyer belt. Figs. 16, 17, and 18 illustrate as a means for freeing the elevating-conveyer belt of such stones or gravel a pair of idler-rolls T, arranged between the upper and lower leaves of the elevating-conveyer belt S and supported to revolve about inclined axes which diverge downwardly and outwardly from the middle line of the elevating-conveyer. These rolls T are supported from the frame of the elevating-conveyer in any suitable way—as, for example, their lower ends can be journaled in bearings on opposite side portions of the elevating-conveyer frame, while their upper ends can be journaled in bearings on a cross-bar 51, arranged between the upper and lower leaves of the belt S and secured at its ends to opposite side portions of the elevating-conveyer frame. These idler-rolls T are arranged to depress the marginal portion of the lower leaf of the belt S, as best shown in Fig. 18, whereby such lower leaf of the elevating-conveyer belt will for a suitable portion of its length sag or slope transversely from its middle line to its edges, and thereby permit stones and the like collecting thereon to readily slide off. The rolls T thus described are in point of position higher than the transversely-arranged belt-cleaner R—that is to say, they are farther toward the upper delivery portion of the elevating-conveyer and are preferably located at what is commonly termed the "upper" end of the lower section of bed-frame of the elevating-conveyer.

In certain figures—for example, Figs. 1 and 2—devices supported upon standard 52 and adapted for operating the raising and lowering chains 1 and 2 are such as have long been in use in machines of this class. Figs. 19, 20, and 21 illustrate as an improvement in such devices a sheave or pulley 53 for the chain or cable 1 and a worm-gear device comprising a worm-wheel 54 and a worm 55 engaging the same. The worm-wheel 54 is secured upon one end of a rotary shaft 56, having the sheave 53 secured to its opposite end, the shaft 56 being supported in a bearing 57 on a yoke-shaped bracket 58, which is in turn secured upon the standard 52. The device for operating chain or cable 2 is old and common and need not be described.

Figs. 22 and 23 illustrate a preferred construction of frame for the elevating-conveyer. As therein shown, the said frame has each of its longitudinal sides constructed with angle-bars 59 and 60, fitted and secured together, as in Fig. 22, the angle-bars 60 being connected with longitudinally-arranged upper angle-bars 61 by means of transversely-arranged metal straps 62. Wooden side boards 63 are bolted to these straps 62 to deaden the noise incident to the operation of the belt, and the cross-braces 64 have their downwardly-extending end portions bolted to the angleplates 60. The lower leaf of the belt is also preferably supported at one or more points by one or more idler-rolls V, having tapered end portions and arranged near the rolls T, (shown in Figs. 16, 17, and 18,) the object of thus tapering the rolls V being to permit rolls T to depress the marginal portions of the lower leaf of the belt S.

What I claim as my invention is—

1. In a ditching and grading machine, a wheeled body-frame; an evener; a suspended plow-beam provided with a plow; and a draft-chain attached to and connecting the plow-beam with the evener and arranged to transmit to the latter the draft strain produced by back pull on the part of the plow in opposition to the draft of the team on the evener.

2. In a ditching and grading machine, a wheeled body-frame; an evener; a suspended plow-beam provided with a plow; and a draft-chain attached to and connecting the plow-beam with the evener and having as an attaching connection therewith a bearing engaging the evener at a point forward of the evener-pivot.

3. In a ditching and grading machine, a wheeled body-frame; a suspended plow-beam provided with a plow; a transversely-arranged stay-bar having articulated connections with the body-frame and the plow-beam, its connection with the plow-beam being adapted for up-and-down adjustment thereon; and a draft-chain by which the plow is drawn attached to the machine forward of the stay-bar and extending back to and engaging the stay-bar.

4. In a ditching and grading machine, a wheeled body-frame; a suspended plow-beam provided with a plow; a transversely-arranged stay-bar having articulated connections with the body-frame and the plow-beam; and a draft-chain attached to the plow-beam in rear of the stay-bar and also connected with the machine at a point forward of the stay-bar, the attaching connection between the draft-chain and the plow-beam being adapted and arranged for up-and-down adjustment independently of the plow-beam, and the star-bar being engaged by the draft-chain between the attached end portions of the latter.

5. In a ditching and grading machine, a wheeled body-frame; a suspended plow-beam provided with a plow; a transversely-arranged stay-bar having articulated connections with the body-frame and the plow-beam; and a draft-chain attached to the plow-beam in rear of the stay-bar and also held upon the machine at a point forward of the stay-bar, the attaching connection between the draft-chain and the plow-beam being adapted and arranged for up-and-down adjustment independently of the plow-beam, and the draft-chain being at a point forward of its connection with the plow-beam in engagement with the stay-bar by a shifting connection permitting the chain to shift laterally and independent of the stay-bar and allowing the stay-bar to swing laterally and independently of the chain.

6. In a grading and ditching machine, a wheeled body-frame; a suspended plow-beam provided with a plow; a draft-chain connected with the plow-beam; and a transversely-arranged stay-bar having jointed connections with the body-frame and the plow-beam, and extending through a link of the draft-chain, its jointed connection with the plow-beam being arranged for up-and-down adjustment thereon.

7. In a ditching and grading machine, a wheeled body-frame; a suspended plow-beam provided with a plow; an evener; and a draft-chain by which the plow is drawn, the forward end of the draft-chain being formed by a link extending under the evener and having a rounded bearing portion which engages the evener at a point in front of the evener-pivot.

8. In a ditching and grading machine, a wheeled body-frame; a suspended plow-beam provided with a plow; and a pair of transversely-arranged stay-bars having articulated connections with the body-frame and the plow-beam, the rear one of these stay-bars being adapted for longitudinal extension and contraction and to such end formed by a bar having a longitudinally-adjustable connection with a guide-socket which is hinged at one end upon the main frame; and a device for locking the bar to said guide-socket.

9. In a ditching and grading machine, a wheeled body-frame having a platform; a suspended plow-beam provided with a plow; a pair of transversely-arranged stay-bars having articulated connections with the body-frame and the plow-beam; and means for laterally and adjustably tilting the plow-beam, comprising a lever arranged within reach of an attendant upon the platform, and power-transmitting connection between the lever and the plow-beam at a point higher than the point of connection between the plow-beam and the rear stay-bar.

10. In a ditching and grading machine, a wheeled body-frame; a suspended plow-beam provided with a plow; a stay-bar having an articulated connection with the body-frame and the plow-beam; a lever supported upon the body-frame; connecting rods or bars respectively connected with the plow-beam and the lever by articulated connections; and a connection between the connecting rods or bars engaging the stay-bar and arranged to shift along the same when the lever is actuated.

11. In a ditching and grading machine, a wheeled body-frame; a suspended plow-beam provided with a plow; a laterally-swinging bracket hinged to the plow-beam; a transversely-arranged stay-bar pivotally attached to said laterally-swinging bracket and having a pivotal connection with the body-frame; a lever supported on the body-frame; and a power-transmitting device having pivotal connections with the lever and the laterally-swinging bracket, its connection with the latter being above the point at which the stay-bar is attached thereto.

12. In a ditching and grading machine, a wheeled body-frame; a suspended plow-beam provided with a plow; a laterally-swinging bracket hinged to the plow-beam; a transversely-arranged stay-bar pivotally attached to the lower portion of the laterally-swinging bracket and having a pivotal connection with the body-frame; a swinging push-and-pull device extending transversely to the length of the plow-beam and pivotally connected with the upper portion of the laterally-swinging bracket; and means for adjustably reciprocating the push-and-pull device.

13. In a ditching and grading machine, a wheeled body-frame; a suspended plow-beam provided with a plow; a laterally-swinging bracket hinged to the plow-beam; a transversely-arranged stay-bar pivotally attached to the laterally-swinging bracket and pivotally connected with the body-frame; connecting rods or bars having shifting pivotal connection with the stay-bar, one of such connecting bars or rods being pivotally connected with the laterally-swinging bracket at a point above the connection of the stay-bar therewith; and a device for operating the connecting rods or bars.

14. In a ditching and grading machine, a wheeled body-frame; a suspended plow-beam provided with a plow; a laterally-swinging bracket hinged to the plow-beam; a transversely-arranged stay-bar pivoted at one end to the laterally-swinging bracket and having its opposite end pivotally connected with the body-frame; a lever supported upon the body-frame; a slide arranged upon the stay-bar; and connecting rods or bars pivotally attached to the lever and laterally-swinging bracket and inclining downwardly to the slide and pivotally attached thereto.

15. In a ditching and grading machine, a carriage provided with a plow and a transversely-arranged elevating-conveyer constructed with an endless soil-carrying belt; and a belt-cleaning device comprising an endless flexible carrier trained over rotary supports and arranged with its upper leaf between the upper and lower leaves of the endless soil-conveying belt of the elevating-conveyer and transverse to the length thereof.

16. In a ditching and grading machine, a carriage provided with a plow and a transversely-arranged elevating-conveyer constructed with an endless soil-carrying belt; and a belt-cleaning device comprising an endless flexible carrier trained over rotary supports and arranged with its upper leaf between the upper and lower leaves of the soil-carrying belt and transversely thereto, its lower leaf being arranged to sag below the lower leaf of the soil-carrying belt, and said endless flexible carrier being provided with projecting arms or blades which successively engage the ground when the machine is in operation and thereby induce travel on the part of the endless flexible carrier to which they are secured.

17. In a ditching and grading machine, a carriage provided with a plow and a transversely-arranged elevating-conveyer constructed with an endless soil-carrying belt; and a belt-cleaning device comprising an endless flexible carrier-belt provided with blades or shovels and arranged transversely to the endless soil-carrying belt with its upper leaf between the upper and lower leaves of such soil-carrying belt; and a scraper arranged to clean adhering soil from the under side of the upper leaf of the endless soil-carrying belt and deflect such soil onto the transverse endless flexible carrier-belt.

18. In a ditching and grading machine, a carriage provided with a plow and a transversely-arranged elevating-conveyer constructed with an endless soil-carrying belt; and a belt-cleaning device comprising an endless flexible carrier-belt arranged transverse to the endless soil-carrying belt and trained over rotary supports, the upper leaf of the flexible carrier-belt being between the upper and lower leaves of the soil-carrying belt; a lower end roll for the endless soil-carrying belt; and a scraper arranged to scrape said roll and deflect the material scraped therefrom onto the transverse flexible carrier-belt.

19. In a ditching and grading machine, a carriage provided with a plow and a transversely-arranged elevating-conveyer constructed with an endless soil-carrying belt; and a belt-cleaning device comprising a shelf arranged transverse to the length of the endless soil-carrying belt and supported between the upper and lower leaves thereof, and an endless flexible carrier trained over rotary supports and having its upper leaf arranged to traverse the said shelf.

20. In a ditching and grading machine, a carriage provided with a plow and a transversely-arranged elevating-conveyer constructed with an endless, flexible soil-carrying belt; and idler-rolls supported between the leaves of the endless, flexible soil-carrying belt in position to depress the lower leaf of such belt toward its edges and thereby downwardly incline its marginal portions.

21. In a grading and ditching machine, a carriage provided with a plow; a transversely-arranged elevating-conveyer, and transversely-arranged stay-bars having articulated connections with the body-frame and the plow, and having its body-frame constructed at one side with standards 28, 34, horizontal sill portions secured to and connecting together the standards; a vertical bar 39 secured alongside one of the standards and a brace-bar 43 connecting together the lower ends of the standards and secured to the bar 39, the standards being set apart to afford space for the elevating-conveyer, and the stay-bars being respectively connected with one standard and with bearings, one on the lower end of bar 39 and the other on the brace 42 and the standard 34.

22. In a ditching and grading machine, a carriage provided with a plow and chains or cables for suspending and raising and lowering the same; and means for operating one of such chains or cables comprising rotary shaft 56 provided with a sheave 53 and a worm-wheel 54, a worm 55 engaging the worm-wheel; and a bearing 57 supporting the said shaft and in turn supported upon a standard on the body-frame of the carriage.

23. In a ditching and grading machine of the class described, the elevating-conveyer comprising an endless belt, one or more tapered rolls V supporting the leaf of the endless belt, and rolls T supported to revolve about inclined axis and arranged to depress opposite marginal portions of the lower leaf of the endless belt.

THOMAS J. GRAY.

Witnesses:
 CHARLES G. PAGE,
 ELIZABETH BURKE.